United States Patent [19]

DeHaan

[11] Patent Number: 4,515,873

[45] Date of Patent: May 7, 1985

[54] LITHIUM CELL HAVING CONTINUOUS DEPLETION GAUGE

[75] Inventor: Abel DeHaan, Pembrook Pines, Fla.

[73] Assignee: Cordis Corporation, Miami, Fla.

[21] Appl. No.: 518,200

[22] Filed: Jul. 28, 1983

[51] Int. Cl.³ .......................................... H01M 10/48
[52] U.S. Cl. ...................................................... 429/91
[58] Field of Search ....................... 429/59, 90, 91, 92, 429/101

[56] References Cited

U.S. PATENT DOCUMENTS

| | | | |
|---|---|---|---|
| 4,136,234 | 1/1979 | Fritts | 429/91 |
| 4,388,380 | 6/1983 | DeHaan et al. | 429/91 |
| 4,416,957 | 11/1983 | Goebel et al. | 429/91 |
| 4,418,129 | 11/1983 | Goebel | 429/91 |

Primary Examiner—Donald L. Walton

Attorney, Agent, or Firm—Henry W. Collins; Thomas R. Vigil

[57] ABSTRACT

A lithium cell which includes an outer conductive housing, a cathode having one major surface in contact with the conductive housing, an insulative separator adjacent to the other major surface of the cathode, and a lithium anode having a pair of major surfaces one of which is adjacent to the insulative separator. A resistive sensing element is disposed within the lithium anode and extends generally in a direction from one of the major surfaces of the lithium anode to the other major surface of the anode. An electrical conductor is connected to the resistive sensing element and extends out of the conductive housing so that as the lithium anode is consumed by the discharge of the cell the electrical resistance as measured between the conductive housing and the electrical conductor provides an indication of the level of discharge of the cell.

4 Claims, 8 Drawing Figures

LITHIUM CELL HAVING CONTINUOUS DEPLETION GAUGE

BACKGROUND OF THE INVENTION

Field Of The Invention

The present invention relates to lithium batteries and, more particularly, to a lithium battery having a depletion gauge or indicator.

Lithium batteries have become well-known for their long life and suitability as power sources for cardiac pacers and nerve stimulators. Normally these batteries utilize a lithium anode, a cathode formed of cupric sulfide or silver chromate, and an electrolytic solution.

With the long life associated with such batteries and due to the fact that such batteries are generally implanted within the human body, it is desirable to have a method for providing an indication of the level of discharge of the battery. This is particularly important in life sustaining devices, such as cardiac pacers, in order to provide adequate time for the replacement of the device, or at least the battery, before failure occurs.

An important feature of the present invention is that of providing a means within a battery, or energy cell, for providing a positive indication of the level of discharge of the battery, or conversely, to provide a positive indication of the remaining life of the battery.

It is important that a positive indication of remaining battery life be provided regardless of the type of service the battery has been providing. In addition, it is important that the depletion gauge or indicator be compatible with the present construction and configuration of lithium batteries utilized in implanted devices, such as cardiac pacers and nerve stimulators.

In certain types of lithium batteries, the internal resistance of the battery increases linearly with the discharge of the battery. With this type of battery, the output voltage provides as satisfactory indication of the remaining life of the battery.

With certain other types of lithium batteries, the voltage output remains approximately constant until the battery is substantially discharged. With still other types of lithium batteries, such as the lithim-cupric sulfide battery, an end-of-life indication may be obtained by taking advantage of the two stages of discharge i.e.:

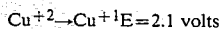

$Cu^{+2} \rightarrow Cu^{+1} E = 2.1$ volts

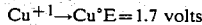

$Cu^{+1} \rightarrow Cu^{\circ} E = 1.7$ volts

By adjusting the ratio of lithium to cupric sulfide, it is possible to control the ratio of these two reactions. Accordingly, when the transition from the higher voltage to the lower voltage occurs, this change in voltage provides an indication that a predetermined level of discharge of the cell has occurred. In batteries used with cardiac pacers, the length of the second voltage level is adjusted to be approximately 10 percent of the first voltage level. One problem with these dual voltage level systems is that once the second level is obtained, the battery may then last from three months to one year depending upon the load applied to the battery at the second voltage level.

With cardiac pacers of more modern design which include complex programmable capabilities, the drain on the battery may vary over a broad range. It therefore becomes desirable to have an additional means for evaluating the residual capacity of the battery at a time early enough to establish orderly plans for the replacement of the device. Also, as greater loads are placed upon batteries, the effectiveness of the dual level indicator system is substantially reduced.

SUMMARY OF THE INVENTION

The present invention is directed toward a lithium cell which comprises an outer conductive housing, at least one cathode member being positioned within the conductive housing and having two major surfaces one of which is in direct electrical contact with the conductive housing, an insulative separator positioned against the other major surface of the cathode member, a lithium anode having first and second major surfaces with the first surface thereof positioned adjacent to the insulative separator, and an anode lead electrically connected to the lithium anode and extending out of the conductive housing. An elongated sensing element is formed of a material which exhibits a resistance depending upon the length thereof and has an electrical resistance greater than the electrical resistance of lithium. The elongated sensing element is disposed within the lithium anode so as to extend generally in a direction from the first major surface of the anode to the second major surface of the anode. An electrical conductor is connected to the sensing element and extends out of the conductive housing. As the lithium anode is consumed by discharge of the cell the electrical resistance between the conductive housing and the electrical conductor provides a continous positive indication of the level of discharge of the cell.

BRIEF DESCRIPTION OF THE INVENTION

Figure 1:
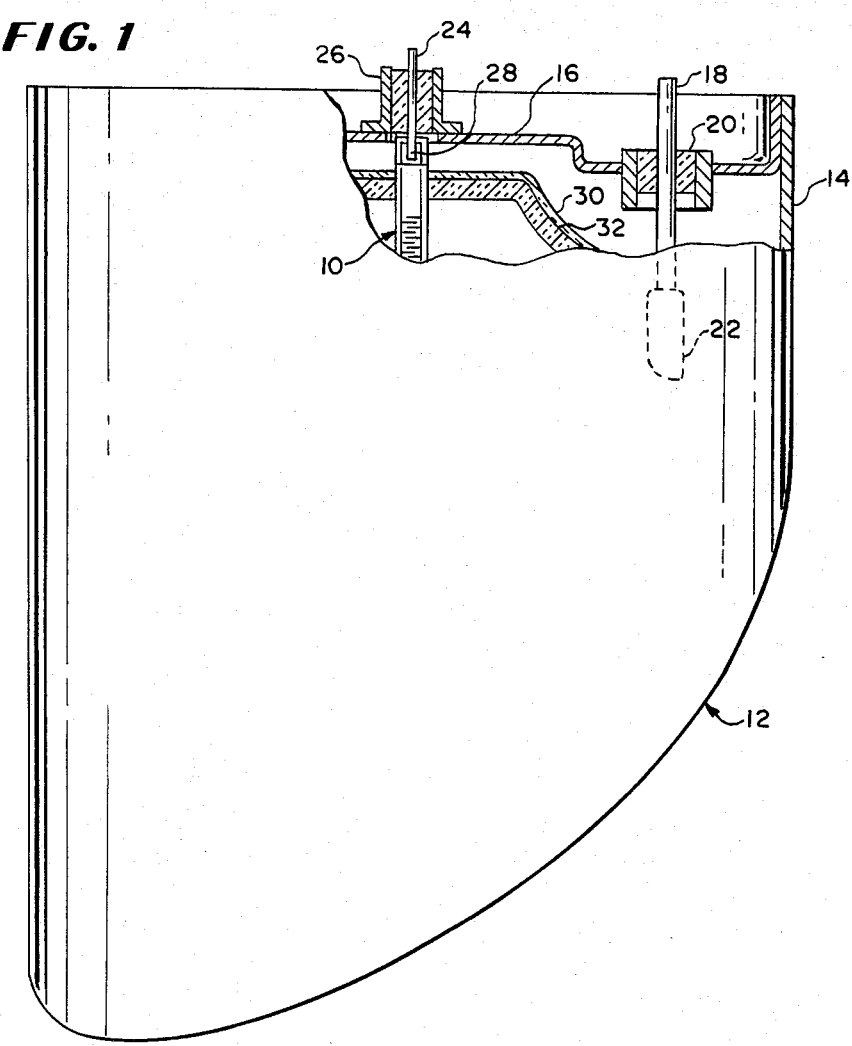
FIG. 1 is an elevational view shown partly in cross-section of a lithium battery with the depletion gauge of the present invention.
Figure 2:
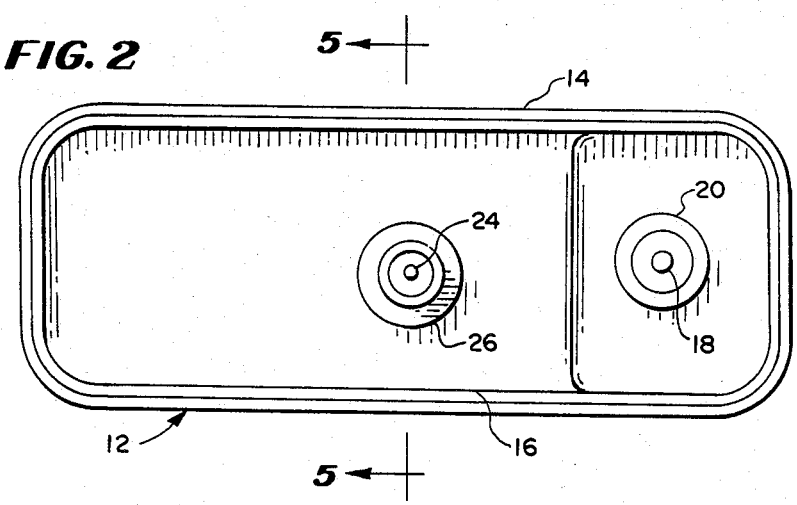
FIG. 2 is a top elevational view of the battery illustrated in FIG. 1.

FIGS. 1 and 2 generally illustrate the depletion gauge 10 of the present invention shown in conjunction with a lithium battery 12. The battery 12 is of a type which may be used with cardiac pacers. More particularly, the lithium battery 12 includes an outer conductive case 14 which is preferably drawn as one piece from stainless steel. A lid member 16 is also formed as one piece from stainless steel and is welded to the top of the conductive case 14 in order to provide a hermetically sealed housing.

An anode lead 18 extends through the lid member 16 by way of a glass-to-metal seal 20. One of the ends 22 of the anode lead 18 is flattened for electrical contact to a lithium anode within the battery 12. A conductive sensing wire 24 also extends through the lid member 16 by way of a glass-to-metal seal 26. One of the ends 28 of the sensing wire which is positioned within the conductive case 14 is connected to the depletion gauge 10. As will be described in more detail, a pair of insulative coverings 30, 32, serve to store electrolyte and electrically insulate the anode from adjacent components within the battery 12.

Figure 3:
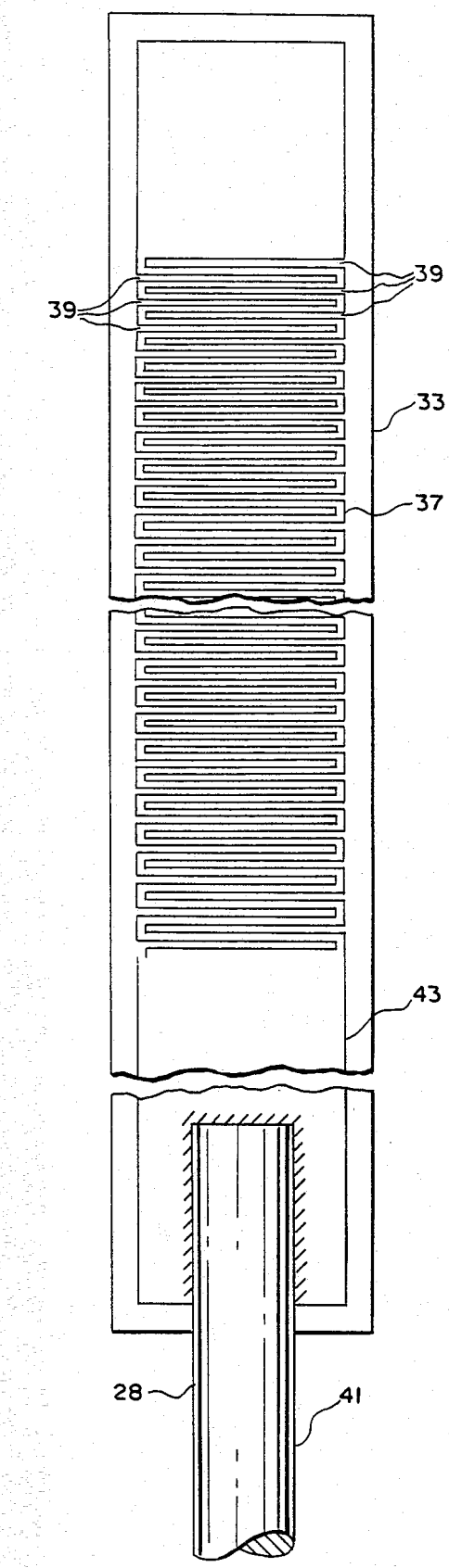
FIGS. 3 and 4 are elevational views of the sensing element of the present invention.
Figure 4:
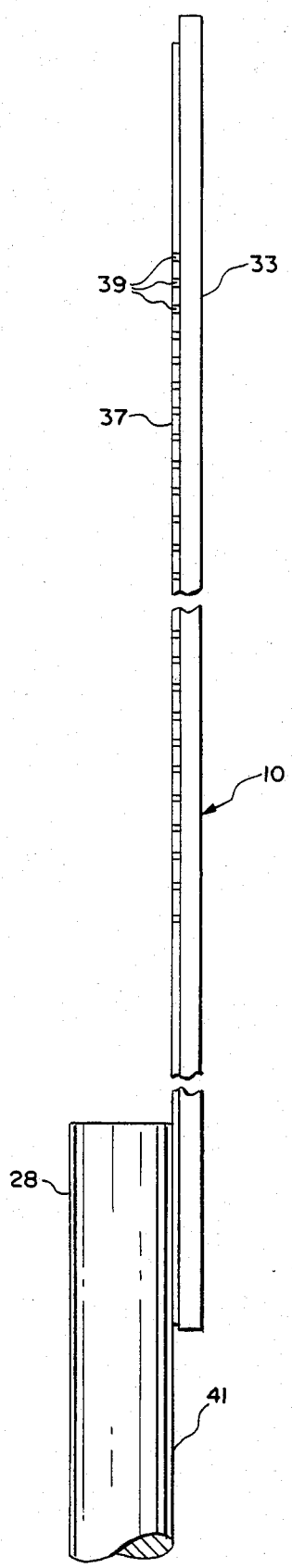

FIGS. 3 and 4 illustrate in more detail the depletion gauge 10 of the preferred embodiment of the present invention. More particularly, the depletion gauge 10 is comprised of a thin insulating strip 33 which is formed of Halar material. A thin film resistive element 37 is mounted on the insulating strip 33. The resistive element 37 is preferably formed of Nichrome and, as illustrated in FIG. 3, this element is constructed from a single piece of Nichrome foil by removing material from the foil so as to form plural parallel slots 39. With this arrangement, the effective cross section of the Nichrome material is substantially reduced in the slotted region and the effective length of the Nichrome material is substantially increased thereby providing a linear resistance over the length of the slotted portion of the resistive element 37.

A conductive lead wire 41 is bonded to one of the ends 43 of the resistive element 37 for providing electrical connection to the resistive element. Preferably, the length of the depletion gauge 10 is approximately 0.5 inches, the width is approximately 0.065 inches, and the thickness is approximately 0.020 inches. In addition, the total resistance of the resistive element 37 is on the order of 750 ohms.

Figure 5:
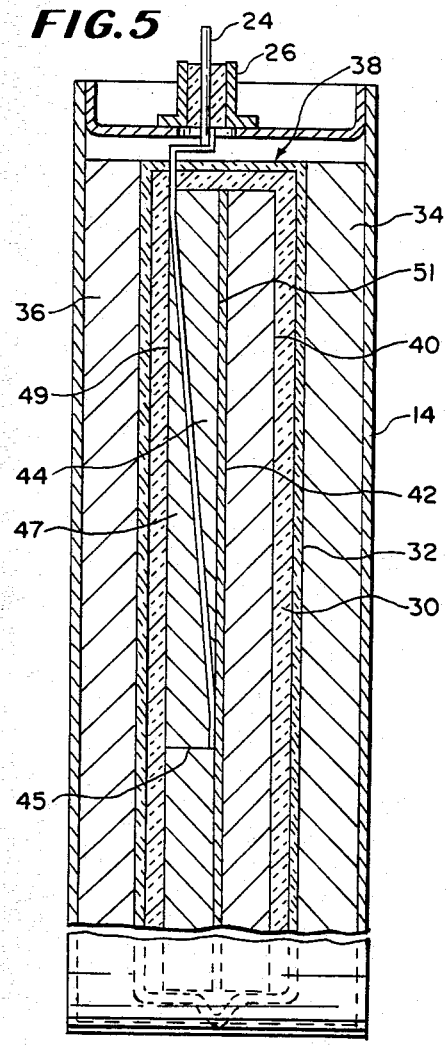
FIG. 5 is a sectional view of the battery shown in FIG. 2 taken along and in the direction of the line 3—3 of FIG. 2 prior to any depletion of the battery.
Figure 6:
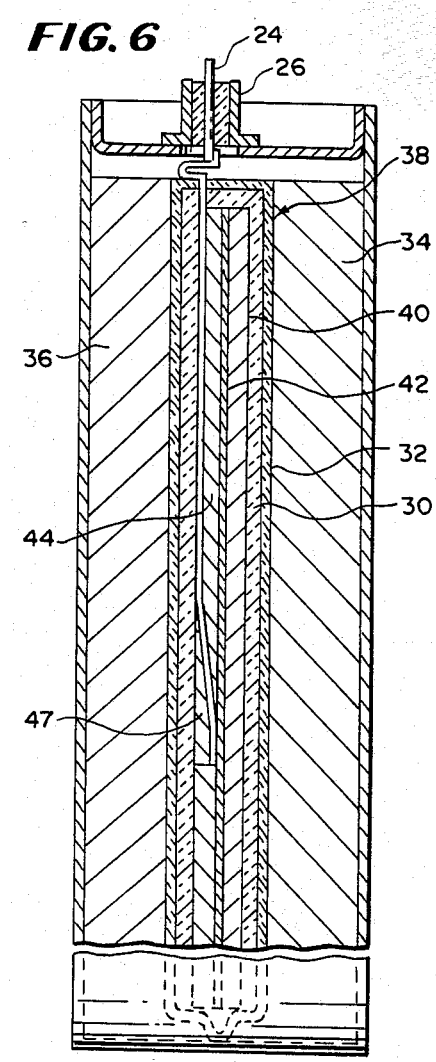
FIG. 6 is a similar view to that illustrated in FIG. 3 after substantial depletion of the battery; and, FIGS. 7 and 8 are expanded view of portions of FIGS. 5 and 6 respectively, which illustrate in more detail a preferred embodiment of the present invention.
Figure 7:
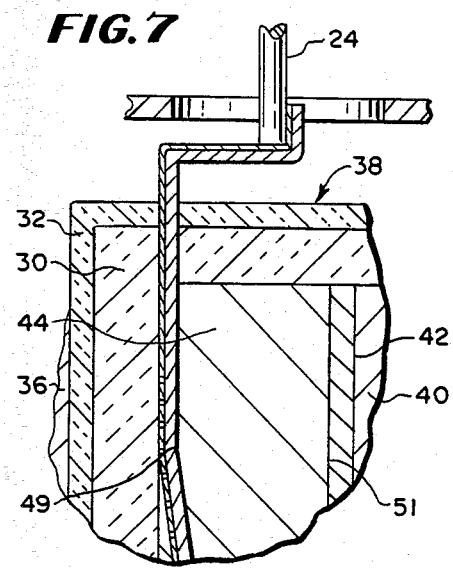
Figure 8:
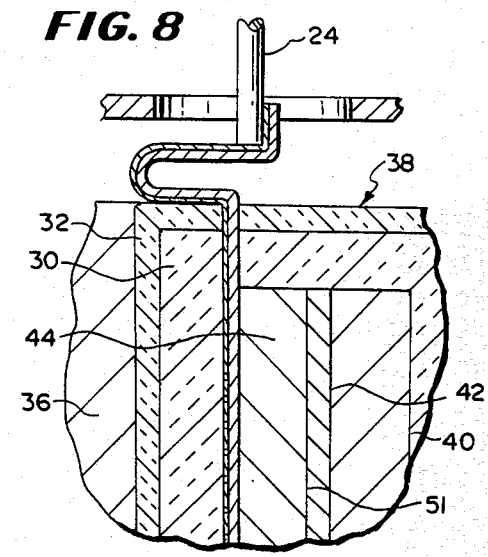

FIGS. 5, 6, 7 and 8 illustrate in more detail the battery 12 and the associated depletion gauge 10. More particularly, FIG. 5, and the corresponding FIG. 7, illustrate the battery 12 and depletion gauge 10 prior to any load, such as a cardiac pacer, being applied to the battery 12. FIG. 6 and the corresponding FIG. 8 illustrate the battery 12 and the depletion gauge 10 after the battery 12 has been depleted to approximately a fifty percent depletion.

As illustrated in FIG. 5, a pair of cathode plates 34, 36 are positioned within the conductive case 14 with major surfaces of each of the cathode plates 34, 36 in direct electrical contact with the conductive case 14. The cathode plates 34, 36 may be formed of various materials but are preferably formed of cupric sulphide.

An anode assembly 38 is also positioned within the conductive case 14 and is interposed between the other major surfaces of the cathode plates 34, 36. The anode assembly 38 includes a first lithium anode 40 which is in electrical contact with a current collector 42. The current collector 42 is in turn electrically connected to the end 22 of the anode lead 18. A second lithium anode 44 is bonded to the other side of the current collector 42. The first lithium anode 40, the current collector 42, and the lithium plate 44 are held tightly together in a side-by-side relationship by an outer insulative covering 30. A second insulative covering 32 is positioned around the first insulative covering 30 to provide a more complete seal between the lithium anode elements and the cathode plates 34, 36.

The second lithium anode 44 is provided with a groove 45 which extends inwardly from the outer surface of the anode and to a depth which increases from the upper portion of the anode to the lower portion of the anode. The groove is of a width to receive the depletion gauge 10, i.e. preferably 0.065 inches and extends from a depth equal to the thickness of the depletion gauge, i.e. approximately 0.020 inches to a depth equal to approximately the thickness of the second lithium anode 44.

As shown, the depletion gauge 10 is disposed in the groove 45 with the resistive element facing toward the outside of the cell. A lithium plug 47 of a configuration similar to the configuration of the groove is then inserted into the groove and is bonded to the lithium anode 44. With this arrangement, the depletion gauge is disposed in the lithium anode and extends generally in a direction from one of the major surfaces 49 to the other major surface 51 of the second lithium anode 44.

As is now apparent, when the battery is initially placed into service, the lithium which is in contact with the resistive element 37 of the depletion gauge 10 effectively shorts out the resistive element 37 and a voltage potential will be developed between the sensing wire 24 and the outer conductive case 14 which is equal to the potential developed by the lithium-cupric sulfide chemistry. As the lithium which is in contact with the resistive element becomes partially consumed, a portion of the resistive element is no longer shorted with the result that the voltage measured between the sensing wire 24 and the conductive case decreases by the amount of the added resistance. As the lithium continues to be consumed this voltage continues to decrease linearly thereby providing a continuous indication of the depletion level of the battery. At the point at which the outer lithium plate is consumed to a point where the thickness of the outer plate is equal to or slightly less than the thickness of the insulating strip 33, the resistive element will no longer be in contact with the lithium and an "open circuit" condition will exist between the sensing wire 24 and the outer casing 24 thereby causing the voltage potential between these conductors to decrease to zero volts. This zero voltage condition is a final indication that the battery is almost entirely discharged.

At the point in time when the outer lithium plates 40, 44 have been depleted or consumed, the cathode plates 34, 36 are increased in thickness as material migrates to these elements. The lithium slab 44 is partially consumed with the result that the voltage potential between the sensing wire 24 and the outer conductive housing 14 has decreased as previously described. However, the voltage potential for a device powered by the battery 12 continues to be developed by the battery becasue of the fact that the lithium anode 44 has been only partially consumed. Once the lithium plates are entirely consumed, the battery becomes entirely depleted.

As may be apparent, the depletion gauge 10 may be positioned within the anode 44 in various configurations so that an indication of battery depletion may be provided at any selected region within the anode.

While the lithium anodes 40, 44, have been shown as of a plate or slab configuration, it should be understood that the invention is equally applicable to anodes of other configurations. Also, while the invention has been shown with a single sensing element, it should be understood that the invention could be used with multiple sensing elements having appropriate resistances all connected internally to a single sensing wire 24 to indicate multiple levels of battery depletion. In addition, while the preferred embodiment has been illustrated with a cathode element of cupric sulfide and an anode element of lithium, it should be appreciated that the invention is useful with any elements which are physically consumed during depletion of the battery.

Thus, while a preferred embodiment of the invention has been described and shown in particularity, the invention may be embodied in various other configurations and arrangements.

What is claimed is:

1. A lithium cell comprising:

an outer conductive housing;

at least one cathode member being positioned within the conductive housing and having two major surfaces one of which is in direct electrical contact with the conductive housing;

an insulative separator being positioned against the other major surface of the cathode member;

a lithium anode having first and second major surfaces, said first surface thereof is positioned adjacent to the insulative separator;

an anode lead electrically connected to the lithium anode, said lead extending out of the conductive housing and being electrically insulated from the housing;

an elongate electrically resistive sensing element formed of a material which exhibits a resistance which is dependent upon the length thereof and having an electrical resistance greater than the electrical resistance of lithium, said elongated sensing element being disposed within said lithium anode so as to extend generally in a direction from the first major surface of said lithium anode to the second major surface of said anode, said sensing element comprising an electrically resistive strip member and an insulative strip member, said electrically resistive strip member having an outer surface and an inner surface, said outer surface facing in a direction toward said first major surface of said lithium anode and said inner surface facing in a direction toward said second major surface of said lithium anode, said outer surface being in direct electrical contact with said lithium anode until said lithium anode is consumed, and said insulative strip member being disposed on said inner surface of said electrically resistive strip member and insulating said electrically resistive strip member from said lithium anode; and, an electrical conductor connected to said sensing element and extending out of said conductive housing and being electrically insulated from said housing so that as the lithium anode is consumed by discharge of the cell the electrical resistance between the conductive housing and the electrical conductor provides a positive indication of the level of discharge of the cell.

2. A lithium cell as defined in claim 1 including a second lithium anode of a thickness equal to approximately the thickness of the first.

3. A lithium cell as defined in claim 2 including a second cathode member positioned within the conductive housing and having two major surfaces one of which is in direct contact with the conductive housing, and a second insulative separator interposed between said second cathode member and said second anode.

4. The lithium cell of claim 1 wherein said electrically resistive strip member extends in a serpentine path along the length of said insulative strip member thereby to have an effective length much longer than said insulative strip member and a corresponding high resistance between the ends of said insulative strip member.

* * * * *